UNITED STATES PATENT OFFICE.

GEORGE FRANÇOIS JAUBERT, OF PARIS, FRANCE.

PROCESS FOR THE PREPARATION OF HYDROGEN BY AUTOCOMBUSTION.

1,040,204. Specification of Letters Patent. Patented Oct. 1, 1912.

No Drawing. Application filed May 11, 1911. Serial No. 626,527.

*To all whom it may concern:*

Be it known that I, GEORGE FRANÇOIS JAUBERT, of 155 Boulevard Malesherbes, Paris, France, have invented certain new and useful Improvements in and Relating to Improved Processes for the Preparation of Hydrogen by Autocombustion, of which the following is a specification.

A process is known for the preparation of hydrogen by auto-combustion in accordance with which after preparing a mixture, which is stable in a cold state, of certain metals, metalloids or alloys with hydrates, it is kindled or heated at a point, in such a manner that the combustion is propagated in the mass without external heating, that is to say, without supplying any additional heat and merely by the effect of the heat of combination, while at the same time hydrogen is liberated.

The process in which the bodies in contact combine one with the other directly, that is to say, after simple kindling and without other intermediary is only applicable to bodies having the necessary affinity for each other.

The object of my present invention is a process intended to permit of the preparation of hydrogen by auto-combustion of mixtures, the constituent elements of which have no affinity or but little affinity for each other and do not combine voluntarily merely as a result of kindling them at a point. In other words, the object of the invention is to render the above process by a dry method, applicable to a whole series of metals, metalloids or alloys, owing to the intervention of an oxidizing agent or comburent.

The present process essentially consists in kindling in a closed vessel a mixture composed of an excess of combustible (metal, metalloid or alloy) and of a comburent or oxidizing agent capable of supporting combustion in the said closed vessel in the presence of water vapor. This water vapor may arise in the mixture itself in which hydrates have been incorporated; that is to say, any aqueous body or body containing hydrogen and oxygen capable of decomposing under heat in liberating water vapor as for example slaked lime, alcoholates, hydrates of carbon and even water which is nothing other than a perfect hydrate. This water vapor might likewise be supplied wholly or partially from the exterior and be produced wholly or partially at the exterior by any appropriate means and more particularly in utilizing the heat of combustion of the mixtures referred to above for vaporizing the water of a boiler as would be done with an ordinary fuel.

*First case.*—Where the water vapor is incorporated directly in the mixture in one of the forms mentioned above the process is carried into practice by preparing a mixture possessing the three following properties:
(1.) Of being combustible in a closed vessel.
(2.) Of containing aqueous bodies, that is to say, bodies capable of liberating water vapor (metallic hydrates, compounds containing water of hydration, of constitution, of interposition, hydrates of carbon, etc.).
(3.) Of containing a metal or metalloid one of their derivatives or a mixture of the said bodies introduced in excess and capable of decomposing the water vapor at high temperature in liberating gaseous hydrogen.

In order to comply with the first of these conditions the selected substance such for example as iron in the form of powder, powdered carbon and so forth is mixed with a comburent or an oxidizing agent (such as an oxygenated salt: chlorate, or perchlorate of potash or a metallic oxid, oxid of lead, manganese, iron) or any other body capable of liberating oxygen and supporting combustion in such a manner as to obtain a mixture in the form of powder stable in a cold state but combustible in a closed vessel in liberating heat.

With iron and chlorate of potash a reaction of the following type is obtained.

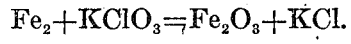

With carbon and perchlorate of potash:

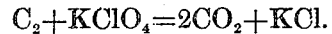

With silicon and oxid of lead:

In order to comply with the second of the conditions set forth there should be added to the above calorific mixture a substance capable of liberating water (such as a metallic hydrate in the form of powder like slaked lime $Ca(OH_2)$ for example or a compound containing water of crystallization (such as plaster $CaSO_4 + 2$ aq. bauxite $Al_2O_3 + H_2O$ etc.) or an alcoholate or a hydrate of carbon. Finally in order to meet the third condition there is added to the calorific mixture either an excess of combustible (iron, carbon, silicon, etc.) or one of their derivatives, ferro-silicon, ferro-chromium, ferro-borium, ferro-carbon, carbid of silicium, carbid of borium, carbid of calcium, aluminium, manganese or a hydrid such as hydrid of calcium $CaH_2$, hydrid of chromium, etc., which excess of combustible will in a hot state decompose the water vapor and permit of the liberation of hydrogen.

If carbon or a derivative containing carbon is employed there is a risk of the hydrogen being contaminated by carbonic acid gas. This latter can be eliminated either by adding to the mass an excess of alkaline hydrate which will retain the carbonic acid gas or by washing the impure hydrogen after it has been prepared in an alkaline lye. Good results are likewise obtained by replacing the metallic hydrates by metallic alcoholates or poly-alcoholates corresponding to the formula: RO—Me, R being a $CH_3, C_2H_5$, etc., group, and Me being a metal. Good results are also obtained by replacing the carbon by a hydrate of carbon such as flour, sugar, dextrin, cellulose, etc.

The total reaction complying with the three conditions set forth above can be represented for iron, chlorate of potash and lime for example, by the following equation:

$$5Fe + KClO_3 + 4Ca(OH)_2 = Fe_2O_3 + Fe_3O_4 + 4CaO + KCl + 4H_2.$$

Similar equations are arrived at with silicon, carbon and other metals or metalloids. The following can be given as examples of mixtures furnishing good results:

Example I: 20 kgs. of iron powder, 10 kgs. of slaked lime, 6 kgs. of perchlorate of potash. A gray powder is obtained which when kindled at a point burns rapidly in giving rise to a violent liberation of hydrogen.

Example II: 20 kgs. of ferro silicon (75% silicon), 10 kgs. of litharge, 60 kgs. of soda-lime (⅔rds soda and ⅓rd lime).

Example III: 20 kgs. of ferro silicon (75% silicon), 5 kgs. of iron powder, 3 kgs. of wheaten flour, 5 kgs. of lime, 3 kgs. of chlorate of potash.

The auto-combustion of these compositions or powders may take place in metal cartridges which at the same time serve for transporting and packing them and which can be introduced into a suitable generating apparatus at the moment of kindling.

*Second case.*—In this case, water vapor may be introduced in any suitable way from the exterior, either in part or in its entirety, instead of being incorporated in the mixture.

What I claim is:—

1. The herein described process for the preparation of hydrogen by auto-combustion, which consists in causing metals of the kind described to act at a high temperature without exterior heating in the presence of water vapor upon an oxidizing agent capable of supporting combustion therein.

2. The herein described process for the preparation of hydrogen by auto-combustion, which consists in causing metals of the kind described to act at a high temperature without exterior heating in the presence of water vapor upon an oxidizing agent capable of supporting combustion therein, said water vapor being produced by incorporating in the mixture a substance capable of liberating water at the temperature of the combustion.

3. The herein described process for the preparation of hydrogen by auto-combustion, which consists in forming a mixture of metals of the kind described, an oxidizing agent capable of supporting combustion, and a substance capable of liberating water at the temperature of the combustion; and kindling the mixture in a closed vessel.

4. The herein described process for the preparation of hydrogen by auto-combustion, which consists in forming a mixture, stable when cold, of a powdered metal, an oxygenated salt capable of liberating oxygen and of supporting combustion of the metal, and a substance capable of liberating water at the temperature of the combustion; and kindling the mixture in a closed vessel.

In testimony whereof I have hereunto placed my hand at Paris (France), this second day of May 1911.

GEORGE FRANÇOIS JAUBERT.

In the presence of two witnesses:
H. C. COXE,
HENRY SCHWAB.